July 2, 1940.  P. E. WIBERG  2,206,274
FISHING TACKLE
Original Filed Nov. 11, 1937
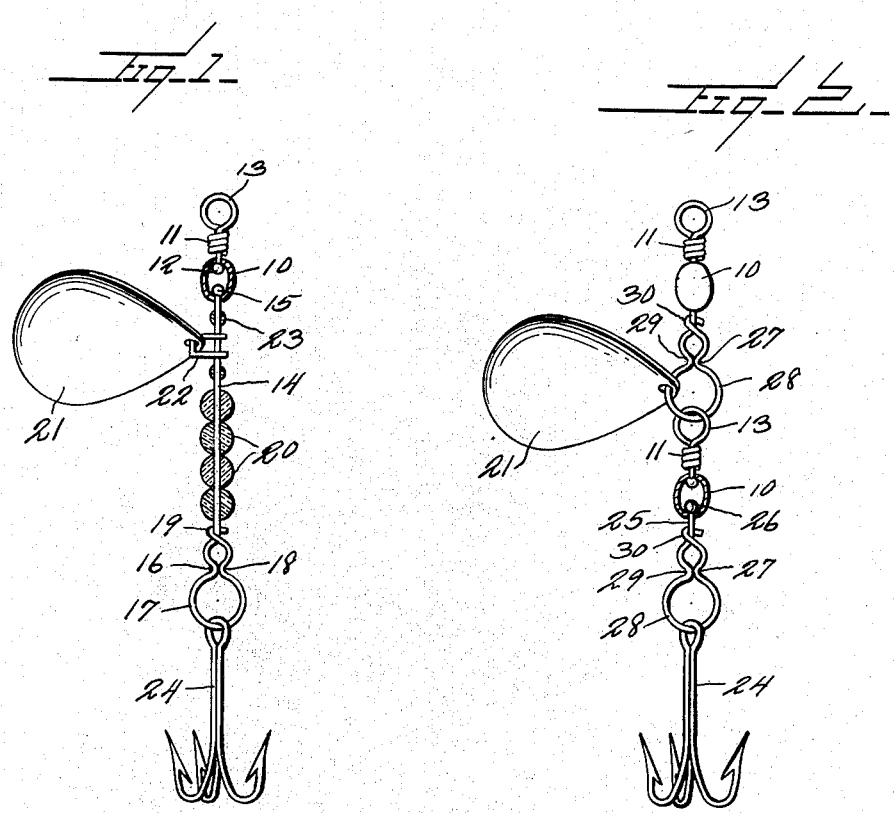
Inventor
Peter E. Wiberg
By Frederick S. Still
Attorney Patented July 2, 1940

2,206,274

UNITED STATES PATENT OFFICE 2,206,274

FISHING TACKLE

Peter E. Wiberg, Newark, N. J., assignor to Art Wire & Stamping Co., Newark, N. J., a corporation of New Jersey Application November 11, 1937, Serial No. 174,088
Renewed November 16, 1939

1 Claim. (Cl. 43—45)

This invention relates to fishing tackle and particularly to the swivel connections used therein.

In tackle as ordinarily made, particularly where spinners are used, it is common to connect the hooks to the leaders by coupling elements which include a swivel or two swivels disposed in tandem. These swivels are commonly connected to the work and leader or to each other, and the work or leader, by split rings, that is, rings formed from a coil of fine wire having at least two convolutions overlapping closely upon each other. These small split rings are slow and tedious to assemble and difficult to handle both when initially assembled and when later the user wishes to change the assembly of swivels, spinners or hooks.

The general object of the present invention is to provide a swivel coupling or connection which is simple, self-contained, cheaper to make, and which may be more readily manipulated than the usual split rings.

A further and more specific object of the invention is to form the shaft of the swivel with a resilient eye at its end remote from the body of the swivel, the extremity of the wire forming the eye being bent to provide a terminal detent or hook which will detachably engage partly around the swivel shaft, the eye being readily opened to permit the attachment of the swivel shaft to an element in the string or readily closed, the eye being so formed, however, as to prevent it from accidentally opening.

Two embodiments of my invention are illustrated in the accompanying drawing wherein:

Fig. 1 is an elevation partly in section of one form of my invention.

Fig. 2 is an elevation of another form of my invention but showing one of the swivel bodies in section.

Referring to Fig. 1, 10 designates the body of a swivel, this body being constructed in the ordinary manner. 11 designates one shaft of the swivel, this shaft being provided with a head 12 disposed within the swivel, an eye 13 and the extremity of the material forming the eye being wrapped around the shaft 10 a number of times. The opposite shaft 14 of the swivel is shown as being relatively elongated. The shaft is provided with a head 15 on its inner end which has rotative engagement with the swivel as usual. The opposite end of the shaft 14 from the head 15 is bent outward and then inward to form a hump 16, then bent to form the eye 17, the wire forming the eye being extended inward to form a hump 18, then outward and then again inward and the extremity of the wire being bent to form an open hook 19 which engages partially around the shaft 14.

As illustrated, the shaft 14 of the swivel is relatively long and disposed on this shaft are a plurality of beads 20 usually brilliantly colored. Disposed between these beads and the swivel body 10 is the spinner 21. The shaft 14 passes through the legs of a clip 22, which loosely engages the spinner thus permitting the spinner and clip to rotate freely around the shaft 14 and permitting the spinner to flutter in the usual manner. A loose bead 23 is illustrated as disposed between the clip 22 and the swivel body 10, this bead being merely for the purpose of preventing frictional engagement between the clip 22 and the body 10 of the swivel. A gang hook 24 is shown as engaged by the eye 17.

In Fig. 2, I show two swivels constructed in accordance with my invention disposed in tandem. The body 10 of each swivel is constructed as previously described, and the upper shaft 11 of each swivel has the usual eye 13, as previously described. The lower shaft 25 of each swivel is a very short shaft having a head 26 rotatably mounted within the corresponding swivel body 10. The shaft 25 extends downward, then is bent laterally outward and then inward to form the hump 27, then bent to form an eye 28 and an opposed hump 29, and the extremity of the wire forming the eye is bent to form an open hook 30. In other words, the swivel shown in Fig. 2 is of exactly the same form as that shown in Fig. 1, but the shaft of the swivel is very short. This is to illustrate the fact that the swivel shafts of my improvement may be made various lengths depending on the character of the tackle being used.

In Fig. 2, the spinner 21 is shown as engaging directly with the eye 28 of the upper swivel. It will be seen that the shaft which constitutes the upper swivel may rotate freely around its axis and that the shaft 11 of the next succeeding swivel 10 may also rotate freely on its axis so that the spinner 21 may rotate and at the same time flutter in a manner required of spinners of this character.

It will be seen that the essential part of my structure is the one member 14 or 25 of the swivel which can be made either long or short and retain the freedom of rotary motion so necessary in fishing tackle, this member or shaft of the swivel having its extremity formed into a spring grip or loop whereby it may be readily connected up in combination with other accessories, such as hooks, blades, spinners, flies or the like.

The humps 16 and 18 in Fig. 1, and the humps or bends 29 and 30 in Fig. 2, perform two important functions. The outward bending of the wire just below the hook 19 (or 30) between the hump 16 (or 29) and the bill 19 of the hook strengthens the grip and prevents the hook 19 from sliding downward on the wire loop or eye 17 under strain. Thus strain upon the eye 17 will not cause the hook 19 to slip down along the shank of the wire. Furthermore, these humps 16 and 18 or 29 and 27 prevent hooks, blades, spinners, etc. from becoming entangled, and this is further assisted by the circular shape given to the eye. In actual practice, the humps 29 and 27 or 16 and 18 may be slightly offset with relation to each other so as to facilitate opening of the loop, that is, the disengagement of the hook 19 or 30 from the shank when it is desired to put a new hook in the eye.

It will be seen that I have provided a construction which is very simple to make and which is much simpler to manipulate than the ordinary split ring or rings and which does entirely away with the need or use of these split rings.

What is claimed is:

As an article of manufacture, a combined swivel and snap hook, comprising a swivel body and a wire shaft having swiveled connection with the body, the shaft being bent to form an open eye, the eye having inwardly extending oppositely disposed humps closely approximating each other, the eye being formed to provide a resilient bill, the extremity of which is bent to form an open hook normally engaging partially around the shank.

PETER E. WIBERG.